(12) United States Patent
Terlizzi et al.

(10) Patent No.: US 8,493,755 B2
(45) Date of Patent: Jul. 23, 2013

(54) POWER SUPPLY WITH ZERO POWER CONSUMPTION CAPABILITY

(75) Inventors: Jeffrey J. Terlizzi, San Francisco, CA (US); Stanley Rabu, Sunnyvale, CA (US); Wendell Sander, Los Gatos, CA (US); Jahan Minoo, South San Francisco, CA (US); Nicholas Ainsley Sims, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/097,877

(22) Filed: Apr. 29, 2011

(65) Prior Publication Data

US 2011/0215656 A1    Sep. 8, 2011

Related U.S. Application Data

(63) Continuation of application No. 12/239,345, filed on Sep. 26, 2008, now Pat. No. 7,956,591.

(51) Int. Cl.
*H02J 1/10* (2006.01)
*G05F 1/00* (2006.01)

(52) U.S. Cl.
USPC ............................. 363/65; 323/284

(58) Field of Classification Search
USPC ............ 323/234, 267, 282, 284, 265, 269, 323/272, 283, 285; 363/65, 67, 81, 84
See application file for complete search history.

(56) References Cited

U.S. PATENT DOCUMENTS

| 5,565,714 | A | 10/1996 | Cunningham |
| 5,963,019 | A | 10/1999 | Cheon |
| 6,376,938 | B1 * | 4/2002 | Williams ............... 307/150 |
| 6,770,986 | B2 | 8/2004 | Nagao et al. |
| 7,394,397 | B2 | 7/2008 | Nguyen et al. |
| 7,400,110 | B2 * | 7/2008 | Potter et al. ............ 318/801 |
| 7,411,317 | B2 | 8/2008 | Liu |
| 7,602,158 | B1 * | 10/2009 | Iacob .................... 323/231 |
| 8,013,583 | B2 * | 9/2011 | Matan .................... 323/282 |
| 8,085,013 | B2 * | 12/2011 | Wei et al. ............... 323/269 |
| 2003/0128561 | A1 * | 7/2003 | Azuma et al. ............ 363/65 |
| 2005/0006958 | A1 * | 1/2005 | Dubovsky ............... 307/64 |
| 2006/0039206 | A1 * | 2/2006 | Taniguchi et al. ....... 365/189.05 |
| 2006/0195627 | A1 * | 8/2006 | Cole et al. ............... 710/15 |

(Continued)

FOREIGN PATENT DOCUMENTS

EP    1087494    3/2001

OTHER PUBLICATIONS

Green Plug—One Plug. One Planet, http://www.greenplug.us/, retrieved Sep. 15, 2010, p. 1.

(Continued)

*Primary Examiner* — Adolf Berhane
*Assistant Examiner* — Jeffrey Gblende
(74) *Attorney, Agent, or Firm* — Womble Carlyle Sandridge & Rice LLP

(57) ABSTRACT

Power supply devices are provided that can include power regulating circuitry for regulating (e.g., transforming or converting) electric power to be passed to an electronic device. A power supply device can also include control circuitry coupled with the regulating circuitry. The control circuitry can determine when the power supply device is coupled with an electronic device. The control circuitry can control the operation of the regulating circuitry based on whether or not the power supply device is coupled with the electronic device.

28 Claims, 7 Drawing Sheets

U.S. PATENT DOCUMENTS

| | | | |
|---|---|---|---|
| 2007/0046106 A1* | 3/2007 | Shintomi | 307/64 |
| 2007/0070558 A1* | 3/2007 | Liu | 361/18 |
| 2008/0055104 A1* | 3/2008 | Masui et al. | 340/693.4 |
| 2008/0252149 A1* | 10/2008 | McCoy et al. | 307/128 |
| 2009/0001938 A1 | 1/2009 | Vantu et al. | |
| 2010/0007315 A1 | 1/2010 | Hsu | |

OTHER PUBLICATIONS

Green Plug Wants to Eliminate Warts From Your Life . . . Wall Warts That Is, http://www.gearlog.com/2008/06/green_plug_wants_to_eliminate.php, Jun. 15, 2008, retrieved Sep. 15, 2010, p. 1.

* cited by examiner

POWER SUPPLY WITH ZERO POWER CONSUMPTION CAPABILITY

CROSS-REFERENCE TO RELATED APPLICATIONS

This application is a continuation of commonly-assigned U.S. patent application Ser. No. 12/239,345, filed on Sep. 26, 2008, and now issued as U.S. Pat. No. 7,956,591 on Jun. 7, 2011, the contents of which are hereby incorporated by reference in their entirety.

FIELD OF THE INVENTION

This relates to apparatus and methods for providing electric power to an electronic device and, more particularly, to apparatus and methods for limiting the consumption of power when providing electric power to an electronic device.

BACKGROUND OF THE DISCLOSURE

Various factors limit the efficiency and functionality of traditional power supply devices used for powering and/or charging electronic devices (e.g., cellular telephones and portable media devices). For example, most traditional power supply devices convert an alternating current ("AC") input to a regulated direct current ("DC") output whenever the power supply device is plugged into a power outlet (e.g., an outlet coupled with a power grid). This wastes power because the power supply continuously provides a regulated power signal even if it is not powering an electronic device. Moreover, it is difficult to design efficient power supply devices for portable electronic devices due to size limitations associated with portability. Additionally, many portable electronic devices have limited interfaces for coupling with a power supply device so it can be difficult for a traditional power supply device to determine when it is coupled with an electronic device. For example, a portable electronic device may include a connector with only a power signal wire and a ground wire, and therefore, no extra wires can be used by a traditional power supply device to determine when it is coupled with the electronic device.

SUMMARY OF THE DISCLOSURE

Power supply devices are provided that can consume less power when not coupled with an electronic device. Such power supply devices can include power regulating circuitry for regulating (e.g., transforming or converting) electric power. For example, a power supply device can include circuitry for converting an electrical signal with an alternating current to an electrical signal having a direct current (e.g., an AC-to-DC converter). A power supply device can also include control circuitry for determining when the power supply device is coupled with an electronic device. For example, the control circuitry may monitor one or more electrical signals to determine when the devices are coupled. In some embodiments, the control circuitry may monitor one or more sensors to determine when the devices are coupled. The control circuitry can control the operation of the regulating circuitry based on whether or not the power supply device is coupled with the electronic device. For example, the control circuitry can enable and disable the regulating circuitry based on whether or not the power supply device and the electronic device are coupled together. In some embodiments, the regulating circuitry can include a low-power regulating circuitry portion and a high-power regulating circuitry portion, and each portion can be independently activated.

The control circuitry can include a processor. In some embodiments, the control circuitry can include a sensor operable to determine when the power supply device is coupled with the electronic device. In some embodiments, the control circuitry can include communications circuitry that can receive data from the electronic device coupled with the power supply device. In some embodiments, a portion of the control circuitry can be located in interface hardware between the power supply device and the electronic device. In some embodiments, the power supply device can also include a connector for coupling with the electronic device, and the control circuitry can include a sensor in the connector for determining when the power supply device is coupled with the electronic device.

In some embodiments, the power supply device can include a power storage device coupled with the control circuitry and able to power the control circuitry when the regulating circuitry is not enabled. The power storage device can be rechargeable, and the regulating circuitry can, when enabled, recharge the power storage device.

In accordance with some embodiments, a method for providing electric power to an electronic device is provided. The method can include determining when a power supply device is coupled with the electronic device. In some embodiments, the determining can include monitoring a characteristic of a power line in the power supply device. The characteristic can be a voltage level, a current level, or a resistance. In some embodiments, the determining can include monitoring a resistance between a ground potential and a shield of a cable for coupling the power supply device with the electronic device. In some embodiments, the determining can include receiving data from the electronic device. For example, the electronic device can send data to the power supply device to instruct the power supply device to provide power.

The method can also include selectively enabling power regulating circuitry based on the determining. The selectively enabling can include selectively enabling the power regulating circuitry when the determining indicates that the power supply device is coupled with the electronic device. The power regulating circuitry can include an AC-to-DC converter. In some embodiments, the method can also include selectively disabling the power regulating circuitry based on the determining.

In some embodiments, a power regulating circuitry may include multiple portions, and the selectively enabling can include selectively enabling one or more of the portions based on the determining. The selectively enabling can also include selectively disabling one or more of the portions based on the determining. For example, a low-power portion of a power regulating circuit can be disabled and a high-power portion of a power regulating circuit can be enabled when the determining indicates that the power supply device is coupled with an electronic device.

In some embodiments, the method can also include using electric power from a power storage device within the power supply device before the selectively enabling.

In accordance with some embodiments, a power supply device is provided. The power supply device can include an AC-to-DC converter that can receive an electric power signal with an alternating current and output an electric power signal with a direct current. The device can also include control circuitry coupled with the converter that can selectively enable the converter when the power supply device is coupled with an electronic device.

In accordance with one embodiment, a method for providing electric power to an electronic device is provided. The method can include determining when a power supply device having an AC-to-DC converter is coupled with the electronic device. The method can also include selectively enabling the AC-to-DC converter based on the determining. The selectively enabling can include selectively enabling the AC-to-DC converter when the power supply device is coupled with the electronic device.

BRIEF DESCRIPTION OF THE DRAWINGS

The above and other features of the invention, its nature and various advantages will be more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
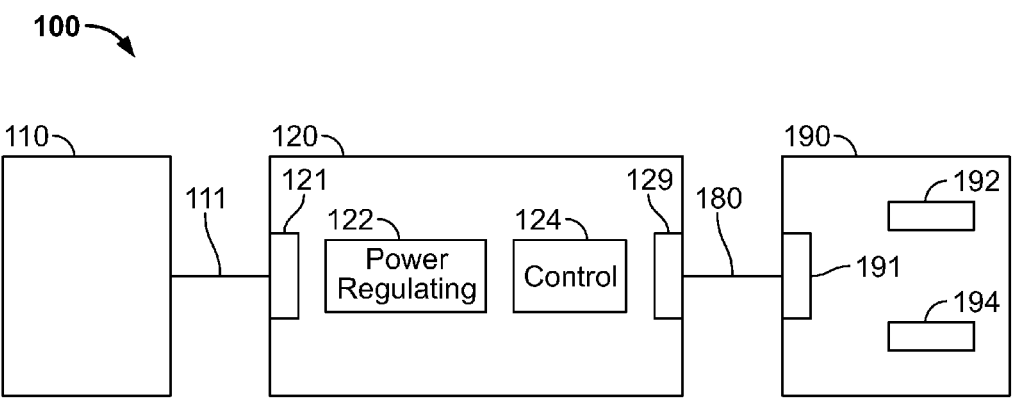
FIGS. 1A and 1B are simplified schematics of electric power supply systems in accordance with various embodiments of the invention.

FIG. 1A includes power supply system 100 in accordance with various embodiments of the invention. System 100 can include external power source 110, power supply device 120, and electronic device 190. External power source 110 and power supply device 120 can be used to provide electric power to electronic device 190. For example, power source 110 and power supply device 120 can provide electric power to electronic device 190 for powering circuitry of electronic device 190 or charging a battery of electronic device 190.

As used herein, the term power supply device and the term power supply unit ("PSU") are interchangeable such that any of the above can be used to refer to a device for coupling an external power source with an electronic device for regulating electric power from the external power source for use by the electronic device.

External power source 110 can provide any type of electric power signal. For example, external power source 110 can provide an electric power signal with an alternating current (i.e., "AC" power). In some embodiments, external power source 110 may be an electric power outlet provided in a structure (e.g., a wall outlet), coupled with a power grid, for example. External power source 110 can provide an electric power signal having any reasonable voltage, current limit, AC frequency, or other characteristics.

PSU 120 can include connector 121 for coupling with external power source 110. While FIG. 1A shows only raw power line 111 between connector 121 and external power source 110, it is understood that any suitable interface hardware (e.g., a cable or connector) can be used to couple connector 121 with external power source 110. Connector 121 can include one or more conductive members (e.g., wires or prongs) for coupling with one or more electric power signals of power source 110. For example, connector 121 can include two conductive members and each member can couple with a respective component of an AC power signal provided by power source 110. In another example, connector 121 can include three conductive members and two members can each couple with a respective component of an AC power signal while one member can couple with a ground wire provided by power source 110.

In some embodiments, connector 121 may be keyed such that it can only couple with certain types of external power supplies (e.g., 120 VAC, 60 Hz power supplies or power supplies having a ground wire).

PSU 120 can include power regulating circuitry 122 for regulating or converting power from external power source 110 such that it can be used to power electronic device 190. As used herein, the term regulating can refer to any type of regulating, converting, conditioning, or other type of manipulation performed on raw electric power from an external source to make the power suitable for use by an electronic device. For example, regulating can include converting raw AC power from an external power source to a power signal having direct current (i.e., "DC" power). In another example, regulating can include converting the voltage of raw power from an external power source to a power signal having a suitable voltage for use by an electronic device (e.g., 5 V). In yet another example, regulating can include limiting the current of an electric power signal so that only a certain amount of power can flow to an electronic device.

In some embodiments, power regulating circuitry 122 can include multiple portions of circuitry and each portion can output a different power signal. In such embodiments, each power signal can have different characteristics. For example, power regulating circuitry 122 can include low power circuitry for outputting power with a reduced voltage or current limit and high power circuitry for outputting power with a higher voltage or current limit. Each portion of power regulating circuitry 122 can operate independently of the other. For example, power regulating circuitry 122 may be configured so that only one portion can operate at a time. In another example, power regulating circuitry 122 may be configured so that any portion can operate at any time.

System 100 can include interface hardware 180 for coupling PSU 120 with electronic device 190. Interface hardware 180 can, for example, be a cable or a docking station. Interface hardware 180 can include one or more conductive lines for providing electrical signals between PSU 120 and electronic device 190. In some embodiments, interface hardware may include a physical structure for supporting electronic device 190 (e.g., a docking station). In some embodiments, interface hardware 180 can be completely removable from PSU 120 and electronic device 190. For example, interface hardware 180 can be a cable that can be used to couple other types of electronic devices together (e.g., an ordinary universal serial bus cable for coupling a peripheral to a personal computer). In other embodiments, interface hardware 180 can be permanently coupled with either PSU 120 or electronic device 190. Permanently coupling interface hardware 180 with PSU 120 or electronic device 190 can prevent interface hardware 180 from accidentally decoupling or becoming lost. In some embodiments, interface hardware 180 can be permanently coupled with both PSU 120 and electronic device 190. In some embodiments, interface hardware 180 may include only connector 129 so that connector 191 of electronic device 190 can couple directly with connector 129 of PSU 120.

PSU 120 can include control circuitry 124 for controlling the operation of PSU 120. Control circuitry 124 can include one or more switches for controlling one or more portions of circuitry within PSU 120. For example, control circuitry 124 can include a switch for enabling and disabling power regulating circuitry 122. In some embodiments, control circuitry 124 can include multiple switches such that each switch can enable and disable a different portion of power regulating circuitry 122. Control circuitry 124 can control power regulating circuitry 122 or a portion thereof by controlling the routing of raw power line 111. For example, control circuitry 124 can decouple raw power line 111 from regulating circuitry 122 to disable regulating circuitry 122. In some embodiments, control circuitry 124 can control regulating circuitry 122 by providing one or more control signals to regulating circuitry 122. In these embodiments, control circuitry 124 may not need to decouple raw power line 111 from regulating circuitry 122 to disable regulating circuitry 122.

Figure 1B:
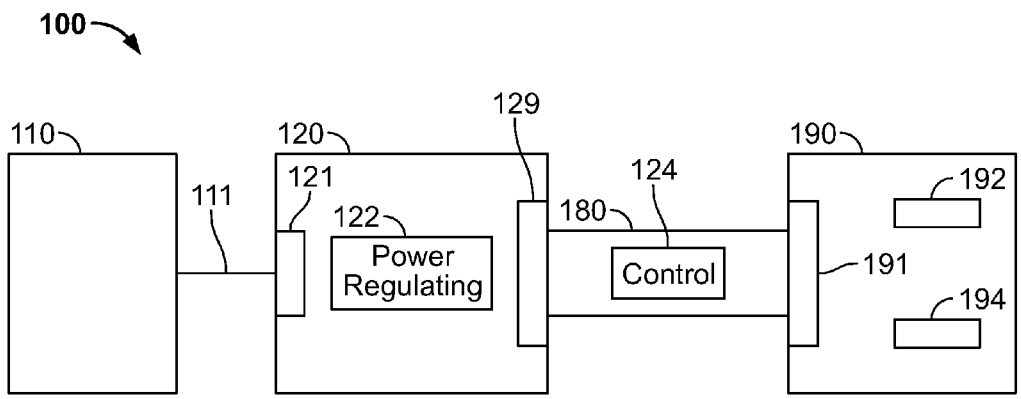

FIG. 1B includes an alternative embodiment of power supply system 100 in accordance with various embodiments of the invention. As shown in FIG. 1B, control circuitry 124 can be included in interface hardware 180 (e.g., a cable or docking station) between PSU 120 and electronic device 190. It is understood that control circuitry 124 can be included in PSU 120, in interface hardware 180, or distributed between PSU 120 and interface hardware 180 without deviating from the spirit and scope of the invention.

Control circuitry 124 can include one or more sensors. Sensors in control circuitry 124 can be used to monitor PSU 120. In some embodiments, control circuitry 124 can include sensors for determining when PSU 120 is coupled with electronic device 190 via interface hardware 180. Control circuitry 124 can include a physical switch that is triggered when PSU 120 couples with electronic device 190. For example, control circuitry 124 can include a microswitch at the end of interface hardware 180 that couples with electronic device 190. The microswitch can be positioned such that it is physically triggered when interface hardware 180 couples with electronic device 190. Control circuitry 124 can include a sensor for monitoring an electrical signal between PSU 120 and electronic device 190. For example, control circuitry 124 can include a capacitive sensor or a hall effect sensor that can be used to determine the amount of current flowing between PSU 120 and electronic device 190. In this manner, a spike in the current can be indicative of PSU 120 coupling with electronic device 190. It is understood that control circuitry 124 can include any suitable circuitry or sensor(s) for determining when PSU 120 couples with electronic device 190 without deviating from the spirit and scope of the invention.

Control circuitry 124 can use information about PSU 120, such as whether or not PSU 120 is coupled with electronic device 190, to control the operation of PSU 120. Control circuitry 124 can control the operation of power regulating circuitry 122 based on whether or not PSU 120 is coupled with electronic device 190. For example, control circuitry 124 may disable power regulating circuitry 122 when PSU 120 is not coupled with electronic device 190. In some embodiments, control circuitry 124 may disable only a portion of power regulating circuitry 122 when PSU 120 is not coupled with electronic device 190. For example, control circuitry 124 may disable high power circuitry in power regulating circuitry 122 when PSU 120 is not coupled with electronic device 190. In this manner, PSU 120 can use less electric power by selectively enabling one or more portions of power regulating circuitry 122 when needed.

In some embodiments, control circuitry 124 can include a processor. The processor can be any suitable processor for controlling PSU 120 (e.g., a microprocessor). The processor can monitor one or more electrical signals to determine when PSU 120 is coupled with electronic device 190. In some embodiments, the processor can monitor one or more signals generated by sensors of control circuitry 124. In some embodiments, the processor can monitor one or more signals passed between PSU 120 and electronic device 190. For example, the processor can use an analog input to monitor an electric power signal provided by regulating circuitry 122. Based on monitored information, the processor can provide one or more outputs to control the operation of other circuitry of control circuitry 124, power regulating circuitry 122, or any other circuitry in PSU 120.

PSU 120 can include connector 129 for coupling PSU 120 with electronic device 190. Connector 129 can include one or more conductive members (e.g., wires or prongs) for providing one or more electric power signals of PSU 120 to electronic device 190. Connector 129 can be keyed such that it can only couple with certain electronic devices. For example, connector 129 can be keyed such that it can only couple with electronic devices that can receive the type of electric power signals output through connector 129.

System 100 can include interface hardware 180 for facilitating the coupling between PSU 120 and electronic device 190. Interface hardware 180 can include any suitable hardware for coupling PSU 120 with electronic device 190. For example, interface hardware 180 can include one or more cables. In some embodiments, interface hardware 180 can include a docking station for physically supporting electronic device 190 when it is coupled with PSU 120.

Electronic device 190 can be any electronic device that receives power from PSU 120. For example, electronic device 190 can be a personal media device, a cellular telephone, or a hybrid device that can both play media and facilitate cellular communications. In some embodiments, electronic device 190 can be a portable media player similar to that sold under the trademark iPod® by Apple Inc. of Cupertino, Calif. In some embodiments, electronic device 190 can be a hybrid portable media player and cellular telephone similar to that sold under the trademark iPhone® by Apple Inc. of Cupertino, Calif.

Electronic device 190 can include circuitry 192 for performing one or more functions. For example, electronic device 190 can include circuitry 192 for conducting wireless communications, playing digital media (e.g., songs or videos), playing video games, or performing any other functions. All or a portion of circuitry 192 may be powered by electric power received from PSU 120. Electronic device 190 can include at least one battery 194 for storing electric power. Each battery 194 may be rechargeable such that it can be charged using electric power from PSU 120, and the stored power can then be used to power circuitry 192 within electronic device 190 when it is not coupled with PSU 120.

Electronic device 190 can include connector 191 for coupling with interface hardware 180 to receive an electric power signal from PSU 120. While FIG. 1A shows only a line between connector 191 and connector 129, it is understood that any suitable interface hardware 180 (e.g., cable or connector) can be used to couple connector 191 with connector 129. In some embodiments, connector 191 can also perform other functions. For example, connector 191 can also be used to communicate with other electronic devices (e.g., other instances of electronic device 190 or personal computers). In this manner, electronic device 190 can use the same connector and some of the same circuitry to receive electric power and communicate with other electronic devices. A Universal Serial Bus (USB) connector is an example of a connector suitable for this purpose. A USB protocol can include four signals: a power signal, a ground signal, and a pair of differential data signals. The power signal is typically referred to as VCC and may maintain a constant 5 VDC. The ground signal is typically referred to as GND and may maintain a constant 0 VDC. Electronic device 190 can receive power through connector 191 over the VCC and GND lines of interface hardware 180 and connector 191. In some embodiments, electronic device 190 can communicate data through connector 191. Communicating data can include transmitting information to another electronic device. As used herein, communicating data is different from providing power because communicating data involves relatively low power signals for transmitting information while providing power involves high power signals for powering a device. In embodiments where connector 191 can also be used for both providing power and communicating data, PSU 120 may include corresponding communications circuitry so that PSU 120 can communicate data with electronic device 190.

Figure 2:
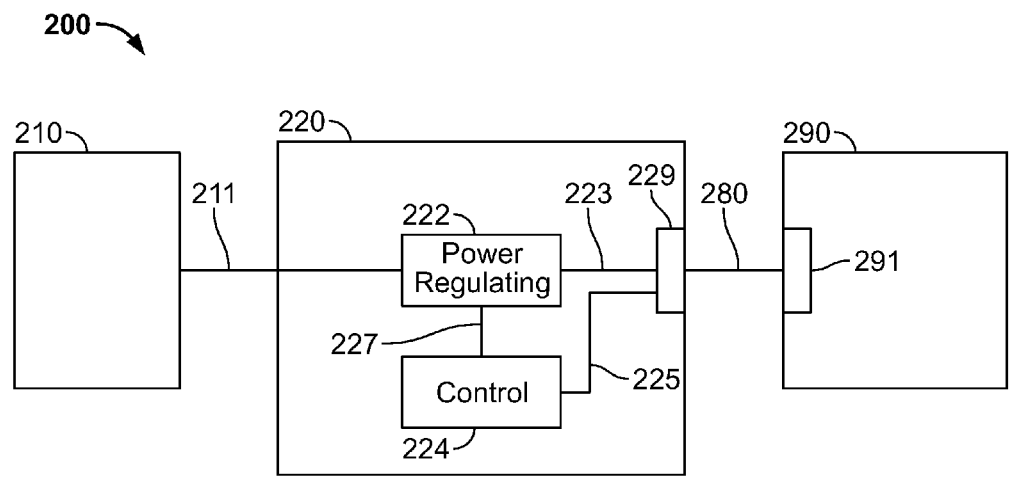
FIG. 2 is a simplified schematic of an electric power supply system in accordance with an embodiment of the invention.

FIG. 2 includes power supply system 200 in accordance with an embodiment of the invention. System 200 can include external power source 210 (see, e.g., external power source 110), PSU 220 (see, e.g., PSU 120) and electronic device 290 (see, e.g., electronic device 190). Power source 210 and PSU 220 can be used to provide electric power to electronic device 290. Circuitry provided by PSU 220 can be selectively enabled such that it only operates when electronic device 290 is coupled with PSU 220.

PSU 220 can include power regulating circuitry 222 (see, e.g., regulating circuitry 122) for regulating electric power for use by electronic device 290. Regulating circuitry 222 can an output electric power signal on line 223 that can have characteristics suitable for use by electronic device 290. For example, an electric power signal on line 223 can be a 5 VDC signal with a current limit determined by regulating circuitry 222.

PSU 220 can include control circuitry 224 (see, e.g., control circuitry 124). Control circuitry 224 can be coupled with power regulating circuitry 222. Control circuitry 224 can provide a control signal on line 227 to regulating circuitry 222 to enable and disable regulating circuitry 222, for example. Control circuitry 224 can control regulating circuitry 222 based on a connection signal provided to control circuitry 224 via line 225 from connector 229. A connection signal on connection line 225 can indicate if PSU 220 is coupled with electronic device 290. By monitoring a connection signal on connection line 225, control circuitry 224 can selectively enable regulating circuitry 222 when electronic device 290 is coupled with PSU 220.

Indicators provided by the connection signal on connection line 225 can be generated by electronic device 290. In some embodiments, electronic device 290 can determine that it is coupled with PSU 220 and output an indicator with a connection signal on connection line 225. In an exemplary USB power supply system, a connection signal on connection line 225 can be a positive leg of the USB differential data signal. In this example, electronic device 290 can drive the positive leg to output a constant high signal as an indicator when electronic device 290 determines that it is coupled with PSU 220. While the constant high signal is just one example, it is understood that any other indicator or pattern of indicators can be generated by electronic device 290 and transmitted to PSU 220 without deviating from the spirit and scope of the invention.

In some embodiments, control circuitry 224 can include communications circuitry for communicating with electronic device 290. For example, electronic device 290 can request a particular type of electric power (e.g., trickle power for charging a battery in electronic device 290) and control circuitry 224 can instruct regulating circuitry 222 to provide the requested type of power. Circuitry for communicating using the USB protocol is an example of suitable communications circuitry in accordance with the invention.

In some embodiments, a connection signal on connection line 225 can be generated by a sensor in interface hardware 280 between PSU 220 and electronic device 290. For example, a connection signal on connection line 225 can be generated by a hall effect or other sensor provided in interface hardware 280 between PSU 220 and electronic device 290.

In some embodiments, control circuitry 224 can include one or more electrical components between raw power line 211 and power regulating circuitry 222 for controlling regulating circuitry 222. For example, control circuitry 224 can include a power transistor with its gate coupled with connection line 225 and with its source and drain coupled between raw power line 211 and an input of power regulating circuitry 222. In this manner, the power transistor can provide power to regulating circuitry 222 when a connection signal on connection line 225 is high, for example. In some embodiments, control circuitry 224 may include circuitry to avoid accidentally enabling regulating circuitry 222 when electronic device 290 is not coupled with PSU 220. For example, control circuitry 224 may include a capacitive element to limit high frequency response such that a temporary voltage spike in a connection signal on connection line 225 does not trigger any response from PSU 220.

Figure 3:
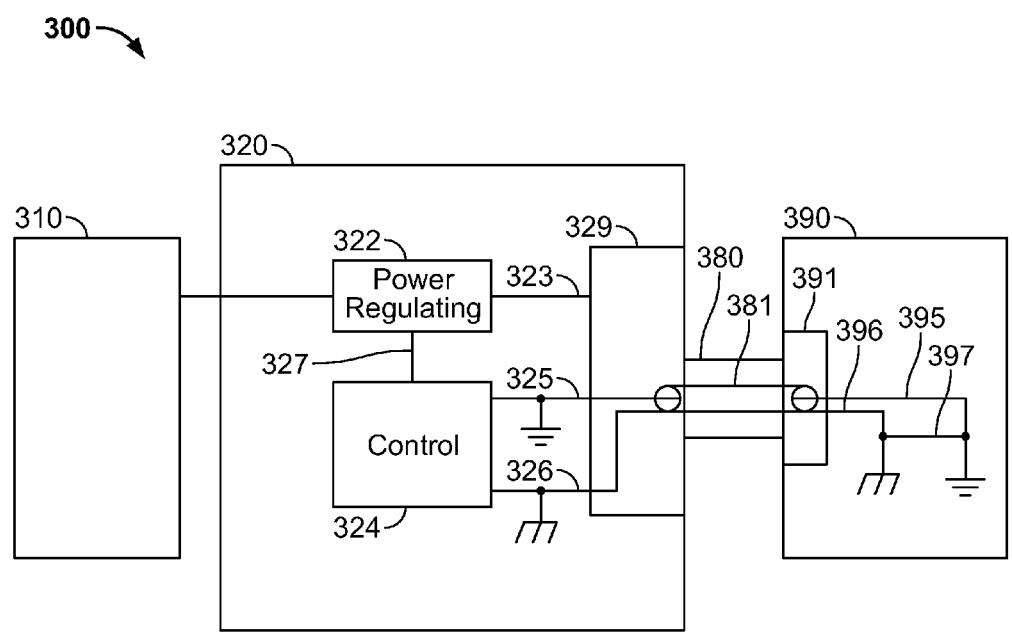
FIG. 3 is a simplified schematic of an electric power supply system in accordance with another embodiment of the invention.

FIG. 3 includes power supply system 300 in accordance with an embodiment of the invention. System 300 can include external power source 310 (see, e.g., external power source 110), PSU 320 (see, e.g., PSU 120) and electronic device 390 (see, e.g., electronic device 190). Power source 310 and PSU 320 can be used to provide electric power to electronic device 390. Circuitry provided by PSU 320 can be selectively enabled such that it only operates when electronic device 390 is coupled with PSU 320.

System 300 can include cable 381 as part of interface hardware 380 for coupling PSU 320 with electronic device 390 (see, e.g., interface hardware 180). Cable 381 can be a shielded cable with any number of wires. For example, cable 381 can be a shielded cable with 30 wires and can include a 4-pin USB connector for coupling with PSU 320 and a 30-pin connector for coupling with electronic device 390. In this example, cable 381 can be used to couple electronic device 390 with PSU 320 or with a computer through a USB port. Connector 329 (see, e.g., connector 129) of PSU 320 can couple with cable 381 and couple the shield of cable 381 to chassis ground line 326. Connector 329 can also route one or more signals within cable 381 to one or more locations in PSU 320. For example, connector 329 can route circuit ground (e.g., GND) from a line of cable 381 to circuit ground line 325 in PSU 320. Connector 329 can also route circuit power (e.g., VCC) from a line (not shown in FIG. 3) of cable 381 to circuit power line 323 in PSU 320. Circuit power may be provided on circuit power line 323. Circuit power line 323 can be coupled with regulating circuitry 322 (see, e.g., regulating circuitry 122) such that electric power output from regulating circuitry 322 can be transmitted through cable 381 to electronic device 390.

Control circuitry 324 (see, e.g., control circuitry 124) can be coupled with circuit ground line 325 and chassis ground line 326. Control circuitry 324 can monitor circuit ground line 325 and chassis ground line 326 to determine when PSU 320 is coupled with electronic device 390. For example, control circuitry 324 may measure the voltage potential, current flow, or resistance between circuit ground line 325 and chassis ground line 326. Control circuitry 324 can then provide a control signal on line 327 to selectively enable regulating circuitry 322 to provide power to electronic device 390.

Electronic device 390 can include connector 391 (see, e.g., connector 191) for coupling with cable 381. Connector 391 can route the shield of cable 381 to chassis ground line 396. Connector 391 can route circuit ground (e.g., GND) from a line of cable 381 to circuit ground line 395. Electronic device 390 can couple circuit ground line 395 with chassis ground line 396. Electronic device 390 can include jumper 397 or any other conductive element for coupling the two ground lines together.

Coupling circuit ground line 395 with chassis ground line 396 of electronic device 390 can allow control circuitry 324 of PSU 320 to easily determine when electronic device 390 is coupled with PSU 320. For example, there may be negligible resistance between circuit ground line 325 and chassis ground line 326 of PSU 320 when PSU 320 is coupled with electronic device 390. Control circuitry 324 can use any suitable method for calculating the resistance between circuit ground line 325 and chassis ground line 326 of PSU 320. For example, control circuitry 324 can provide a very small voltage potential between the two ground lines and measure the resulting current to calculate the resistance.

Figure 4:
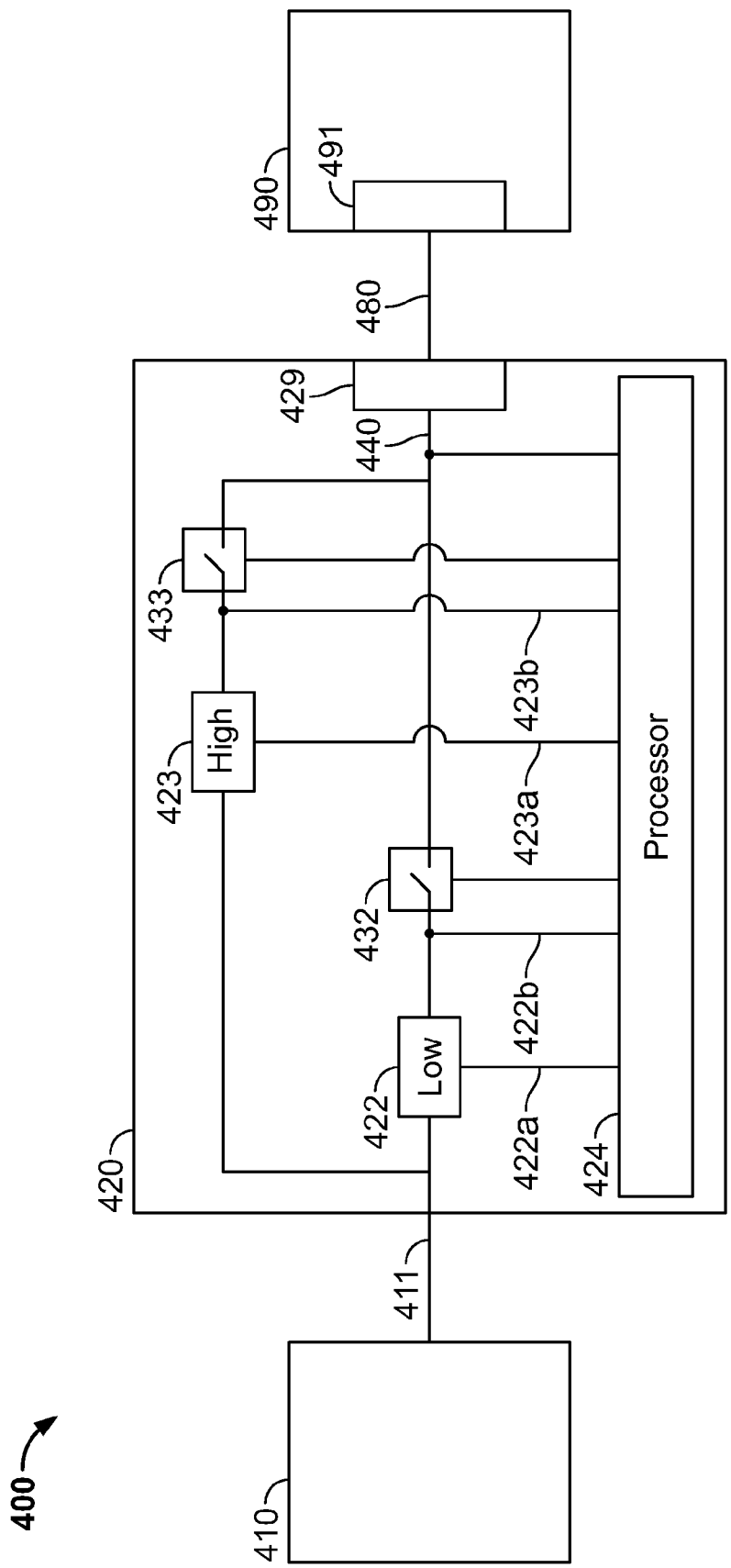
FIG. 4 is a simplified schematic of an electric power supply system in accordance with another embodiment of the invention.

FIG. 4 includes power supply system 400 in accordance with an embodiment of the invention. System 400 can include external power source 410 (see, e.g., external power source 110), PSU 420 (see, e.g., PSU 120), and electronic device 490 (see, e.g., electronic device 190). Power source 410 and PSU 420 can be used to provide electric power to electronic device 490. PSU 420 can receive raw electric power from external power source 410 on raw power line 411. Certain power regulating circuitry of PSU 420 can be selectively enabled such that the certain power regulating circuitry only operates when electronic device 490 is coupled with PSU 420. PSU 420 can include connector 429 for coupling with electronic device 490. For example, connector 429 can couple with interface hardware 480 (see, e.g., interface hardware 180), and interface hardware 480 can couple with connector 491 of electronic device 490.

PSU 420 can include control circuitry such as processor 424 for controlling PSU 420 (see, e.g., control circuitry 124). Processor 424 can be any suitable processor for controlling PSU 420. For example, processor 424 can be a microprocessor. Processor 424 can control power regulating circuitry in PSU 420. For example, processor 424 can be coupled with low-power control line 422a and high-power control line 423a. Processor 424 can be coupled with low-power regulating circuitry output 422b, high-power regulating circuitry output 423b and electric power line 440. Processor 424 can operate using electric power provided on low-power regulating circuitry output 422b or electric power provided on high-power regulating circuitry output 423b. In some embodiments, processor 424 can monitor electric power line 440 to determine when PSU 420 is coupled with electronic device 490. For example, processor 424 may monitor changes in the voltage of electric power on electric power line 440 or the current flowing through electric power line 440 to determine when PSU 420 is coupled with electronic device 490.

PSU 420 can include low-power regulating circuitry 422 (e.g., a low-power AC-to-DC converter) and high-power regulating circuitry 423 (e.g., a high-power AC-to-DC converter). Processor 424 can be coupled with low-power regulating circuitry 422 and high-power regulating circuitry 423. For example, processor 424 can provide a control signal to low-power regulating circuitry 422 on low-power control line 422a and another control signal to high-power regulating circuitry 423 on high-power control line 423a. Processor 424 can selectively control (e.g., enable and disable) the operation of low-power regulating circuitry 422 and high-power regulating circuitry 423 using signals on control lines 422a and 423a respectively. When regulating power, low-power regulating circuitry 422 may consume less power than high-power regulating circuitry 423.

Low-power regulating circuitry 422 can regulate raw power to have a low voltage or low current limit. For example, the voltage and current output by low-power regulating circuitry 422 can be just high enough to power processor 424. Low-power regulating circuitry 422 may not regulate enough power for powering electronic device 490. Accordingly, low-power regulating circuitry 422 can power processor 424 so that processor 424 can determine when PSU 420 is coupled with electronic device 490. Processor 424 can use any suitable method for determining when PSU 420 is coupled with electronic device 490. In some embodiments, processor 424 can monitor an electric power signal on electric power line 440 to determine when PSU 420 is coupled with electronic device 490. In some embodiments, processor 424 can monitor one or more sensors to determine when PSU 420 is coupled with electronic device 490. For example, as discussed above in connection with FIGS. 1A, 1B and 2, one or more sensors can be provided in PSU 420 or interface hardware 480 for determining when PSU 420 is coupled with electronic device 490. In some embodiments, processor 424 can monitor one or more electrical signals from connector 429 (see, e.g., connector 129) to determine when PSU 420 is coupled with electronic device 490.

Processor 424, upon determining that PSU 420 is coupled with electronic device 490, can disable low-power regulating circuitry 422 and enable high-power regulating circuitry 423. High-power regulating circuitry 423 can regulate raw electric power to have, with respect to low-power regulating circuitry 422, a higher voltage or a higher current limit. High-power regulating circuitry 423 can provide a sufficient amount of power for powering electronic device 490. Accordingly, high-power regulating circuitry 423 can regulate power for use by electronic device 490. Processor 424 can also operate using electric power from high-power regulating circuitry 423 (e.g., if low-power regulating circuitry 422 is disabled).

PSU 420 can include programmable switch 432 and programmable switch 433. Processor 424 can independently control the operation of switches 432 and 433. Switch 432 and switch 433 can each be a transistor for coupling the output of, respectively, regulating circuitry 422 and regulating circuitry 423 with power line 440. Processor 424 can use switch 432 to decouple low-power regulating circuitry 422 from power line 440 when circuitry 422 is disabled. Processor 424 can use switch 433 to decouple high-power regulating circuitry 423 from power line 440 when circuitry 423 is disabled. By decoupling disabled power regulating circuitry 422 or 423 from power line 440, a signal on power line 440 may be more sensitive to PSU 420 coupling with or decoupling from electronic device 490. In some embodiments, processor 424 can open both switch 432 and switch 433 when PSU 420 is not coupled with electronic device 490. In these embodiments, processor 424 can operate with power from low-power regulating circuitry output line 422b and monitor electric power line 440 to determine when PSU 420 couples with electronic device 490. In this embodiment, processor 424 may easily determine when PSU 420 is coupled with electronic device 490 because, with switch 432 and switch 433 open, any voltage or current on electric power line 440 must be from electronic device 490. Once processor 424 determines that PSU 420 is coupled with electronic device 490, processor 424 can close switch 433 and use high-power control line 423a to enable high-power regulating circuitry 423. Processor 424 can also open switch 432 and disable low-power regulating circuitry 422 once processor 424 determines that PSU 420 is coupled with electronic device 490. In some embodiments, the advantages of opening switch 432 or switch 433 can include preventing electric power from flowing backwards into the output of regulating circuitry 422 or regulating circuitry 423.

It is understood that switches 432 and 433 can each be replaced by a transistor or any other electronic component suitable for coupling and de-coupling electric power lines without deviating from the spirit and scope of the invention.

Figure 5A:
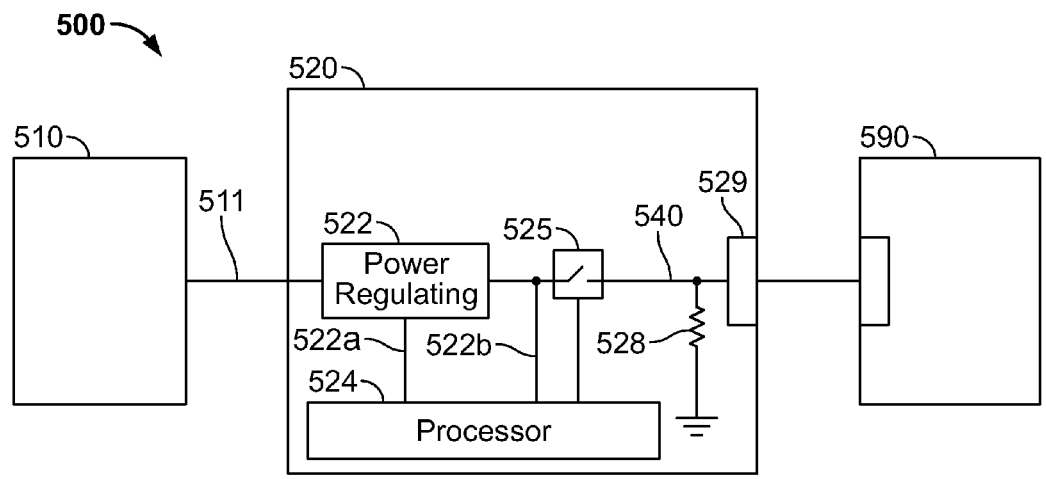
FIGS. 5A and 5B are simplified schematics of electric power supply systems in accordance with various embodiments of the invention.

FIG. 5A includes power supply system 500 in accordance with an embodiment of the invention. System 500 can include external power source 510 (see, e.g., external power source 110), PSU 520 (see, e.g., PSU 120) and electronic device 590 (see, e.g., electronic device 190). Power source 510 and PSU 520 can be used to provide electric power to electronic device 590.

PSU 520 includes power regulating circuitry 522 (see, e.g., power regulating circuitry 122) for regulating a raw electric power signal provided on line 511 from power source 510. Power regulating circuitry 522 may be configured so that circuitry 522 is always operating when PSU 520 is coupled with power source 510.

PSU 520 can include connector 529 (see, e.g., connector 129) for coupling with electronic device 590. PSU 520 can include electric power line 540 for providing regulated electric power from regulating circuitry 522 to connector 529 and, therefore, electronic device 590. PSU 520 may include output resistance, modeled by resistor 528 in FIG. 5, between electric power line 540 and ground potential. Output resistance can be a provided such that charge does not accumulate on electric power line 540 when PSU 520 is not coupled with electronic device 590.

PSU 520 can include control circuitry such as processor 524 for controlling PSU 520 (see, e.g., control circuitry 124). Processor 524 can be any suitable processor for controlling PSU 520. For example, processor 524 can be a microprocessor. Processor 524 can be coupled with control line 522a for controlling power regulating circuitry 522. Processor 524 can be coupled with output line 522b of power regulating circuitry 522. Processor 524 can operate using electric power from output line 522b. In some embodiments, processor 524 can monitor output line 522b to determine when PSU 520 is coupled with electronic device 590. For example, processor 524 may monitor changes in the voltage of a signal on output line 522b or the current flowing through output line 522b to determine when PSU 520 is coupled with electronic device 590.

PSU 520 can include programmable switch 525. Switch 525 can selectively couple output line 522b with electric power line 540. Processor 524 can be coupled with switch 525 so that processor 524 can control the operation of switch 525. In some embodiments, switch 525 can be a transistor having its gate coupled with processor 524 and its source and drain between output line 522b and electric power line 540. Switch 525 can be used to decouple output line 522b from electric power line 540 when PSU 520 is not coupled with electronic device 590. Accordingly, power from power regulating circuitry 522 may not be dissipated over output resistance (e.g., resistor 528) when PSU 520 is not coupled with electronic device 590. Using switch 525 to minimize the dissipation of power over output resistance (e.g., resistor 528) is advantageous because it can prevent PSU 520 from wasting power. While switch 525 may be open by default, processor 524 can periodically close switch 525 so that processor 524 can measure a signal on output line 522b to see if PSU 520 is coupled with electronic device 590. Processor 524 can close switch 525 at any frequency suitable for monitoring whether PSU 520 has coupled with electronic device 590. For example, processor 524 can close switch 525 at a frequency of once a second or once every three seconds. If processor 524 determines that PSU 520 has coupled with electronic device 590, the processor can then keep switch 525 closed so that power from regulating circuitry 522 is provided to electronic device 590 through power line 540. Processor 524 can keep switch 525 closed until processor 524 determines that PSU 520 is no longer coupled with electronic device 590.

Figure 5B:
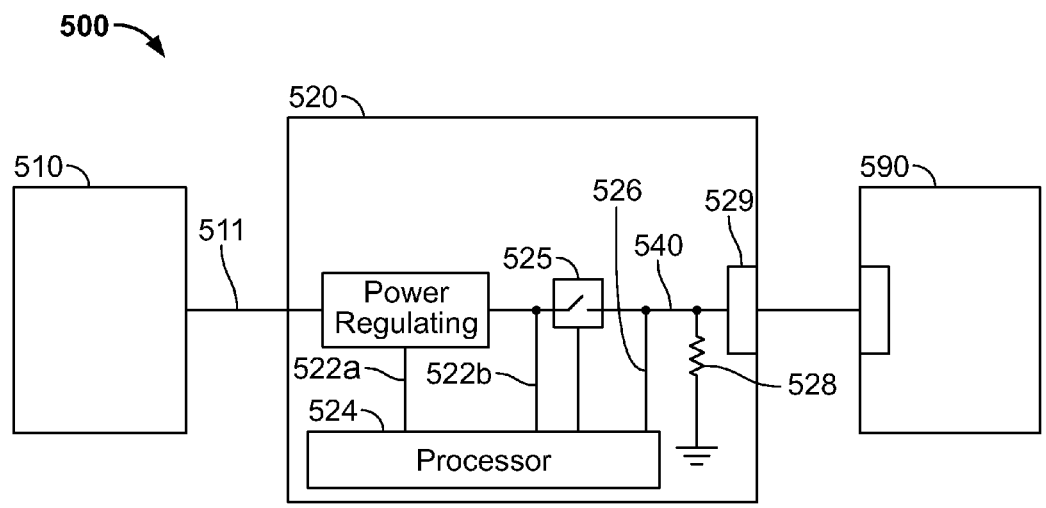

FIG. 5B includes an alternative embodiment of power supply system 500 in accordance with various embodiments of the invention. In the embodiment shown in FIG. 5B, processor 524 is coupled with electric power line 540 using monitoring line 526. Accordingly, processor 524 can monitor electric power line 540, and therefore determine when PSU 520 is coupled with electronic device 590 without activating switch 525. The alternative embodiment shown in FIG. 5B can, with respect to the embodiment of FIG. 5A, further conserve power because switch 525 may never be activated unless PSU 520 is coupled with electronic device 590.

Figure 6:
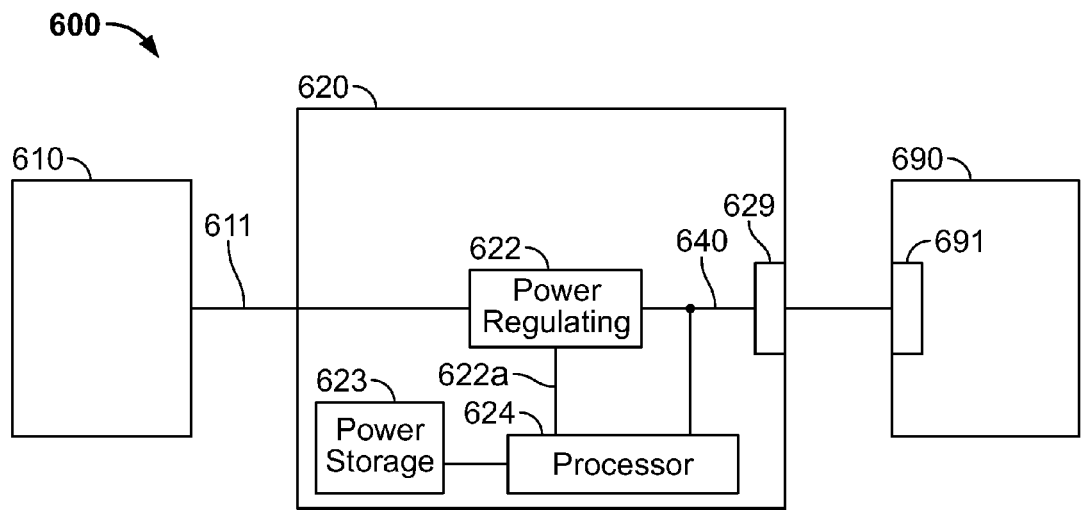
FIG. 6 is a simplified schematic of an electric power supply system in accordance with yet another embodiment of the invention.

FIG. 6 includes power supply system 600 in accordance with an embodiment of the invention. System 600 can include external power source 610 (see, e.g., external power source 110), PSU 620 (see, e.g., PSU 120), and electronic device 690 (see, e.g., electronic device 190). Power source 610 and PSU 620 can be used to provide electric power to electronic device 690. PSU 620 can couple with electronic device 690 through interface hardware 680 (see, e.g., interface hardware 180). Circuitry in PSU 620 can be selectively enabled such that it only operates when electronic device 690 is coupled with PSU 620.

PSU 630 can include power regulating circuitry 622 (see, e.g., power regulating circuitry 122) for regulating raw electric power line 611 from power source 610. The output of power regulating circuitry 622 can be coupled with electric power line 640. Electric power line 640 can be coupled with connector 629 (see, e.g., connector 129) for use by electronic device 690.

PSU 620 can include control circuitry such as processor 624 for controlling PSU 620 (see, e.g., control circuitry 124). Processor 624 can be any suitable processor for controlling PSU 620. For example, processor 624 can be a microprocessor. Processor 624 can be coupled with power regulating circuitry 622 so that processor 624 can control power regulating circuitry. For example, processor 624 can provide a control signal to power regulating circuitry 622 on control line 622a so that processor 624 can enable and disable power regulating circuitry 622. Processor 624 can be coupled with electric power line 640. Processor 624 can monitor electric power line 640 to determine when PSU 620 is coupled with electronic device 690. For example, processor 624 may monitor changes in the voltage of a signal on electric power line 640 or the current flowing through electric power line 640 to determine when PSU 620 is coupled with electronic device 690.

PSU 620 can include power storage device 623. Power storage device 623 can be any device suitable for storing electric power. For example, power storage device 623 can be an electrochemical battery. Power storage device 623 can be coupled with processor 624. Power storage device 623 can provide a low-power electrical signal to processor 624 for powering processor 624. Accordingly, processor 624 can operate without enabling power regulating circuitry 622. When processor 624 determines that PSU 620 is coupled with electronic device 690, processor 624 can then enable power regulating circuitry 622 to provide electric power to electronic device 690 on power line 640. While processor 624 uses electric power from power storage device 623 when power regulating circuitry 622 is disabled, processor 624 can use power from electric power line 640 when processor 624 has enabled regulating circuitry 622. It is understood that circuitry may be provided in PSU 620 for switching the power input of processor 624 between power storage device 623 and electric power line 640.

In some embodiments, PSU 620 can include circuitry (not shown) for disabling processor 624 when PSU 620 is not coupled with power source 610. One or more sensors can be used to determine when PSU 620 is coupled with power source 610. In some embodiments, a physical switch can be provided by PSU 620 so that the switch is triggered when PSU 620 coupled with power source 610. For example, such a switch can be located on the mating surface between PSU 620 and power source 610. In some embodiments, an electrical sensor can be used to measure the voltage of a signal on raw power line 611 or the current flowing through raw power line 611. It is understood that any suitable technique can be used to determine when PSU 620 is coupled with power source 610. When PSU 620 is not coupled with power source 610, PSU 620 can disable processor 624 to conserve electric power in power storage device 623. Circuitry in PSU 620 can, for example, disable processor 624 by providing a control signal to processor 624. In another example, circuitry in PSU 620 can disable processor 624 by decoupling power storage device 623 from processor 624.

In some embodiments, power storage device 623 can be rechargeable. For example, power storage device 623 can be a rechargeable battery. In these embodiments, power storage device 623 can be recharged when power regulating circuitry 622 is operating (i.e., when PSU 620 is coupled with electronic device 690). Processor 624 can control the charging of power storage device 623 by coupling electric power line 640 with power storage device 623. PSU 620 can include circuitry for limiting the current flow from electric power line 640 to power storage device 623 when charging storage device 623.

In some embodiments, power storage device 623 can be charged using power regulating circuitry 622 even when PSU 620 is not coupled with electronic device 690. PSU 620 may be able to charge power storage device 623 using raw power line 611 from power source 610. Processor 624 of PSU 620 may be able to control the charging of power storage device 623. For example, processor 624 may monitor the amount of electric power in storage device 623 and, when the amount drops below a threshold, enable power regulating circuitry 622 for recharging power storage device 623. To monitor the amount of power in storage device 623, processor can monitor the voltage of storage device 623. Charging power storage device 623 when PSU 620 is not coupled with electronic device 690 may be necessary if PSU 620 goes a long time without coupling with electronic device 690.

It is understood that an power storage device similar to power storage device 623 can be used in accordance with any embodiment of the invention. For example, PSU 120 can include a battery for powering control circuitry 124 when power regulating circuitry 122 is not enabled. While the above example relates to PSU 120, any other PSU described herein can use a power storage device without deviating from the spirit and scope of the invention.

While the foregoing system descriptions primarily refer to determining when a PSU couples with an electronic device, it is understood that the same systems can also be used to determine when a PSU decouples from an electronic device. For example, the same indicator or indicators used to determine when a PSU couples with an electronic device can also be used to determine when the PSU decouples from the electronic device. Control circuitry in a PSU may continuously or periodically monitor one or more indicators to determine if the PSU has decoupled from an electronic device. For example, control circuitry can monitor one or more indicators to determine when the PSU is not coupled with any electronic device. Upon determining that a PSU is not coupled with an electronic device, control circuitry may disable power regulating circuitry to conserve power.

Figure 7:
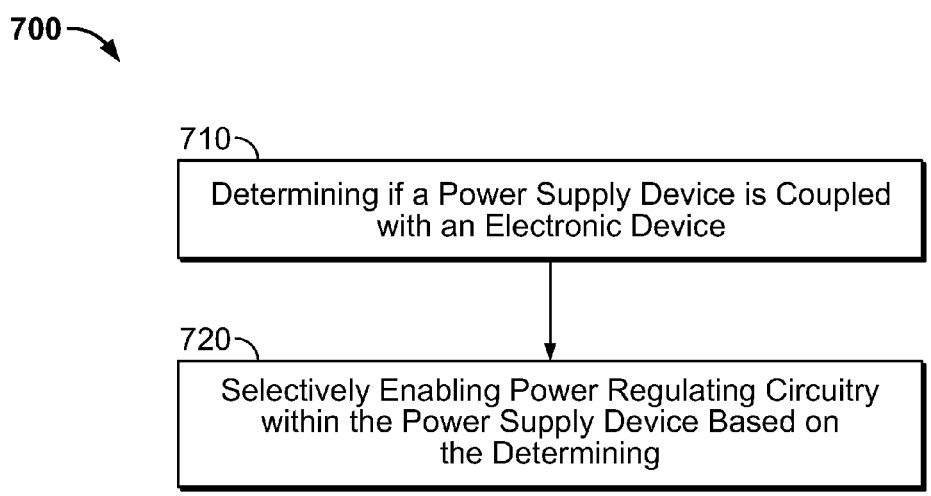
FIG. 7 is an illustrative flowchart of a method for providing electric power to an electronic device in accordance with an embodiment of the invention.

FIG. 7 is a flowchart of method 700 for providing electric power to an electronic device in accordance with an embodiment of the invention. Method 700 can be performed by a power supply device (see, e.g., PSU 120). At step 710, it can be determined if a power supply device is coupled with an electronic device. This determining can include monitoring one or more signals generated by an electronic device. In some embodiments, this determining can include monitoring one or more sensors. In some embodiments, this determining can include monitoring a characteristic of a power line in the power supply device. The characteristic can be a voltage level, a current level or a resistance. The determining can include, for example, coupling the power line with control circuitry for monitoring the characteristic (see, e.g., PSU 520 with processor 524 and switch 525). After the characteristic is monitored, the power line can be decoupled from the control circuitry if it is determined that the power supply device is not coupled with the electronic device. The determining performed at step 710 can include monitoring a resistance between a ground potential and a shield of a cable for coupling the power supply device with the electronic device (see, e.g., control circuitry 324 and cable 381). In some embodiments, this determining can include receiving data from the electronic device. For example, control circuitry in a power supply device (see, e.g., control circuitry 124) can receive data from an electronic device indicating that the electronic device is coupled with the power supply device. Step 710 can be performed by control circuitry (see, e.g., control circuitry 224) in the power supply device.

At step 720, power regulating circuitry within the power supply device can be selectively enabled based on the determining. For example, the power supply device can selectively enable power regulating circuitry if the power supply device is coupled with an electronic device. Power regulating circuitry can include an AC-to-DC converter. In some embodiments, different portion of power regulating circuitry can be independently enabled based on the determining. For example, a high-power regulating circuitry portion can be enabled if the power supply device is coupled with an electronic device, and a low-power regulating circuitry portion can be enabled if the power supply device is not coupled with an electronic device. In some embodiments, a programmable switch may be provided at the output of the high-power regulating circuitry. Method 700 can include opening the switch when the power supply device is not coupled with any electronic device and closing the switch when the power supply device is coupled with the electronic device.

In some embodiments, method 700 can include using electric power from a power storage device within the power supply device (see, e.g., power storage device 623) before performing step 720. Method 700 can further include disabling the power regulating circuitry based on the determining performed at step 710. For example, if the power supply device determines that it is not coupled with any electronic device, the power supply device can disable the power regulating circuitry.

Figure 8:
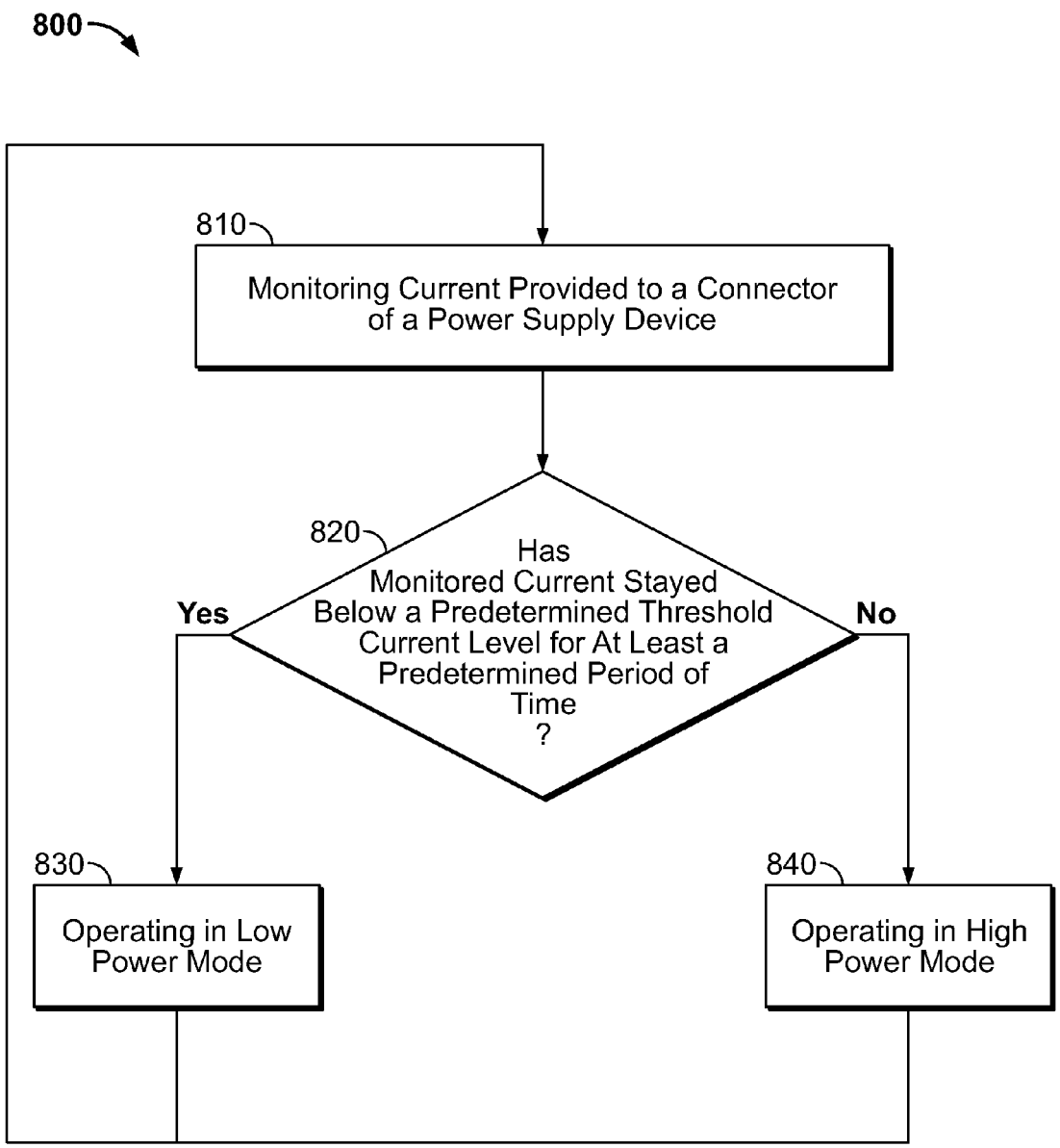
FIG. 8 is an illustrative flowchart of a method for providing electric power to an electronic device in accordance with another embodiment of the invention.

FIG. 8 is a flowchart of method 800 for providing electric power to an electronic device in accordance with an embodiment of the invention. Method 800 can be performed by a power supply device (see, e.g., PSU 120). At step 810, the current provided to a connector of the power supply device can be monitored. The connector can be a connector in a power supply device for coupling with an electronic device (see, e.g., connector 129). The current can be monitored by control circuitry in the power supply device. At step 820, a decision can be made as to whether the monitored current stayed below a predetermined threshold current level for at least a predetermined period of time. The predetermined period of time can be any amount of time suitable for averaging the monitored current. Averaging the monitored current over time can prevent a power supply device from reacting to short spikes in current that would otherwise be a false alarm. The predetermined threshold can be selected to be the minimum amount of current an electronic device will draw when coupled with the power supply device. Accordingly, a power supply device can recognize a coupling with an electronic device even if the electronic device is operating using only a minimal amount of current (e.g., operating in standby or trickle charge mode).

If the answer to step 820 is yes, method 800 can proceed to step 830. At step 830, the power supply device can operate in low power mode. For example, the device can enable low-power regulating circuitry. If the answer to step 820 is no, method 800 can proceed to step 840. At step 840, the power supply device can operate in a high power mode. For example, the device can enable high-power regulating circuitry. The output of the power regulating circuitry can be coupled with an output of the power supply device and used by the electronic device. After step 830 or step 840, method 800 can proceed with step 810 at the beginning of the method. In some embodiments, a delay may be provided after step 830 or step 840 so that a power supply device is not constantly monitoring current. For example, a three second delay may be provided so that the power supply device performs method 800 once every three seconds.

Figure 9:
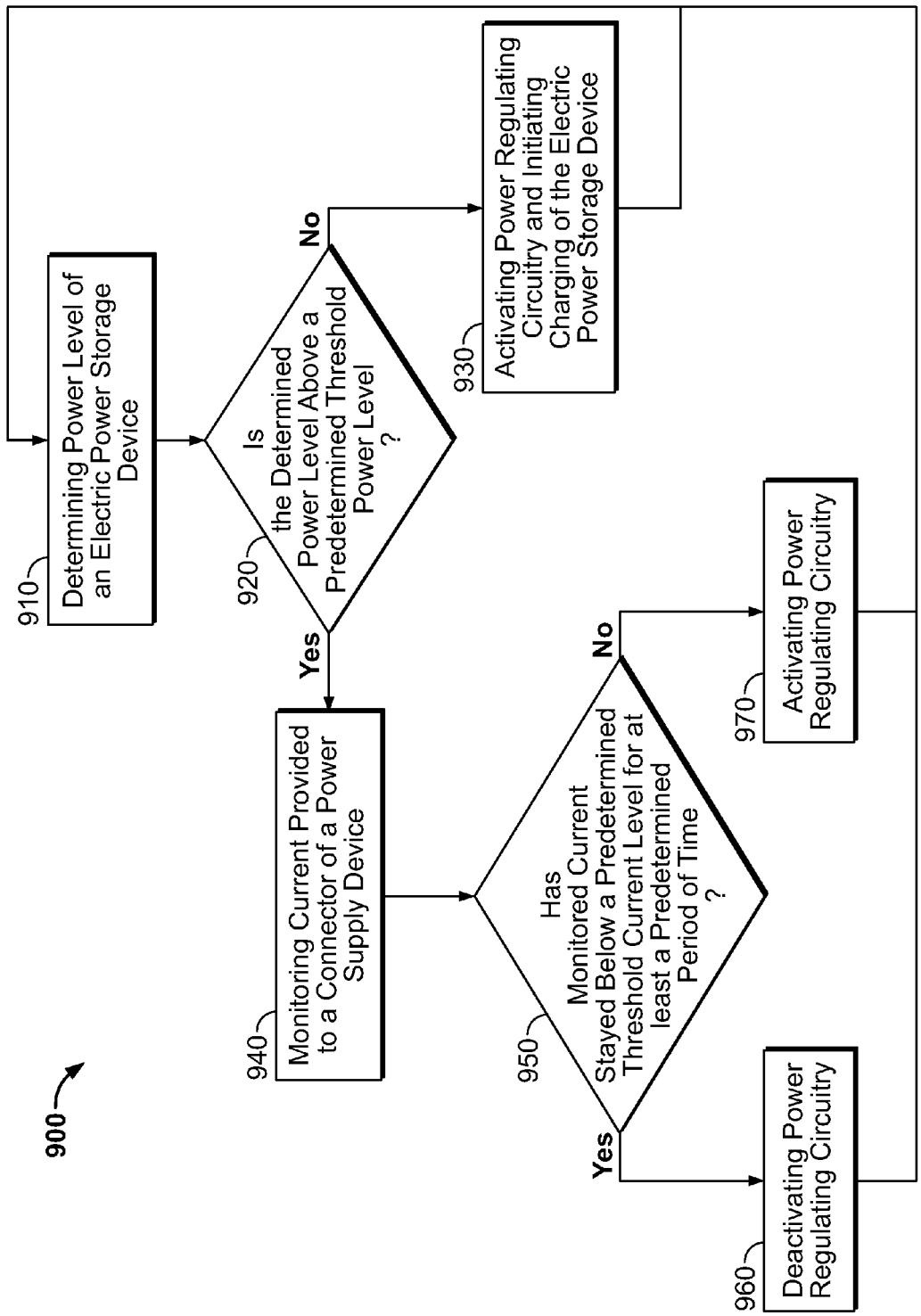
FIG. 9 is an illustrative flowchart of a method for providing electric power to an electronic device in accordance with another embodiment of the invention.

FIG. 9 is a flowchart of method 900 for providing electric power to an electronic device in accordance with an embodiment of the invention. Method 900 can be performed by a power supply device with an electric power storage device (see, e.g., PSU 620). One or more steps of method 900 can be performed by a processor (see, e.g., processor 624) in a power supply device. At step 910, the power level of an electric power storage device can be determined. For example, the voltage of the electric power storage can be measured to determine the power level. At step 920, a decision can be made as to whether the determined power level is above a predetermined threshold power level. For example, the voltage level of the power storage device can be compared to a threshold voltage level. If the answer to the decision at step 920 is no, method 900 can proceed with step 930. At step 930, power regulating circuitry is activated and charging of the electric power storage device is initiated. The threshold power level used in step 920 can be selected so that it is higher than the minimum power level at which control circuitry (see, e.g., processor 624) in the power supply device can function. Accordingly, the threshold power level can be set so that the control circuitry is always functioning when the power supply device is coupled with a power source (see, e.g., power source 610). A power supply device can use electric power from the regulating circuitry to charge the electric power device. After step 930, method 900 may return to step 910 to reevaluate the power level of the power storage device. In some embodiments, a delay may be inserted between step 930 and step 910 so that the power storage device has time to charge before the power level of the storage device is reevaluated. For example, a delay of 10 minutes may be provided so that the power storage device has time to accumulate a substantial charge.

If the answer to the decision at step 920 is yes, method 900 can proceed with step 940. At step 940, the current provided to a connector of the power supply device can be monitored. The connector can be a connector in a power supply device for coupling with an electronic device (see, e.g., connector 629). The current can be monitored by control circuitry in the power supply device. At step 950, a decision can be made as to whether the monitored current stayed below a predetermined threshold current level for at least a predetermined period of time. The predetermined period of time can be any amount of time suitable for averaging the monitored current. Averaging the monitored current over time can prevent a power supply device from reacting to short spikes in current that would otherwise be a false alarm. The predetermined threshold can be selected to be the minimum amount of current an electronic device will draw when coupled with the power supply device. Accordingly, a power supply device can recognize a coupling with an electronic device even if the electronic device is operating using only a minimal amount of current (e.g., operating in standby or trickle charge mode).

If the answer to step 950 is yes, method 900 can proceed to step 960. At step 960, the power supply device can deactivate power regulating circuitry. Power regulating circuitry can be deactivated to save electric power when the current measured at step 940 indicates that the power supply device is not coupled with an electronic device. In cases where power regulating circuitry is already deactivated, step 960 may not involve any action on behalf of the power supply device. If the answer to step 950 is no, method 900 can proceed to step 970. At step 970, the power supply device can activate power regulating circuitry. The output of the power regulating circuitry can be coupled with an output of the power supply device and used by the electronic device. After step 960 or step 970, method 900 can proceed with step 910 at the beginning of the method. In some embodiments, a delay may be provided after performing method 900 and before beginning again with step 910 so that a power supply device is not constantly monitoring power levels and current. For example, a three second delay may be provided so that the power supply device performs method 900 once every three seconds.

It is to be understood that the foregoing is only illustrative of the principles of the invention, that various modifications can be made by those skilled in the art without departing from the spirit and scope of the invention, and that the invention is limited only by the claims that follow.

What is claimed is:
1. A power supply device comprising:
 a low-power regulating circuitry operable to receive an electric power signal and output a regulated electric power signal up to a first power limit;

a high-power regulating circuitry operable to receive an electric power signal and output the regulated electric power signal up to a second power limit, wherein the second power limit is higher than the first power limit;
a first switch disposed between the low-power regulating circuitry and the output of the power supply device, operable to switch between at least an open position and a closed position;
a second switch disposed between the high-power regulating circuitry and the output of the power supply device, operable to switch between at least an open position and a closed position;
control circuitry powered by the low-power regulating circuitry and operable to selectively enable the low-power and the high-power regulating circuitry when the power supply device is coupled with an electronic device, wherein the selectively enabling is independent from the position of the first and the second switches, wherein the selectively enabling is independent from a power level of the electric power signal.

2. The device of claim 1, wherein the low-power and the high-power regulating circuitry each comprises an AC-to-DC converter.

3. The device of claim 1, wherein the first and second power limits are current limits.

4. The device of claim 1, wherein the control circuitry is operable to independently enable the low-power regulating circuitry and the high-power regulating circuitry.

5. The device of claim 1, wherein the control circuitry is operable to determine when the power supply device is coupled with the electronic device.

6. The device of claim 1, wherein the control circuitry comprises a processor.

7. The device of claim 1, wherein the control circuitry comprises a sensor operable to determine when the power supply device is coupled with the electronic device.

8. The device of claim 1, wherein the control circuitry comprises communications circuitry operable to receive data from the electronic device coupled with the power supply device.

9. The device of claim 1, wherein at least a portion of the control circuitry is located in interface hardware between the power supply device and the electronic device.

10. The device of claim 9, further comprising a connector for coupling with the electronic device, wherein the control circuitry comprises a sensor located in the connector for determining when the power supply device is coupled with the electronic device.

11. The device of claim 1, further comprising a power storage device coupled with the control circuitry and operable to power the control circuitry when both the low-power and the high-power regulating circuitry are not enabled.

12. The device of claim 11, wherein the power storage device is rechargeable, and wherein either the low-power or the high-power regulating circuitry, when enabled, is operable to recharge the power storage device.

13. The device of claim 1, wherein the control circuitry is operable to selectively disable the low-power and the high-power regulating circuitry when the power supply device is not coupled with any electronic device.

14. A method for providing electric power to an electronic device, the method comprising:
coupling a power supply device to a source of raw electrical power, wherein the power supply device comprises a low-power and a high-power regulating circuit and a first and a second switch coupled between the low-power and the high-power regulating circuits and the electronic device and operable to switch between at least an open position and a closed position;
providing power to at least a portion of a control circuitry with the low-power regulating circuit;
determining when the power supply device is coupled with the electronic device; and
selectively enabling the low-power and high-power regulating circuit based on the determining, wherein the selectively enabling is independent from the position of the switches, wherein the selectively enabling is independent from a power level of the raw electric power.

15. The method of claim 14, wherein the determining comprises monitoring a characteristic of a power line in the power supply device, the characteristic being selected from the group consisting of:
a voltage level;
a current level; and
a resistance.

16. The method of claim 15, further comprising:
coupling the power line with the control circuitry for monitoring the characteristic; and
decoupling the power line from the control circuitry when the determining indicates that the power supply device is not coupled with the electronic device.

17. The method of claim 14, wherein the determining comprises: monitoring a resistance between a ground potential and a shield of a cable for coupling the power supply device with the electronic device.

18. The method of claim 14, wherein the determining comprises receiving data from the electronic device.

19. The method of claim 14, further comprising using electric power from a power storage device within the power supply device before the selectively enabling.

20. The method of claim 14, wherein the selectively enabling comprises selectively enabling the high-power regulating circuitry when the determining indicates that the power supply device is coupled with the electronic device.

21. The method of claim 14, wherein the low-power and high-power regulating circuit each comprises an AC-to-DC converter.

22. The method of claim 14, further comprising selectively disabling the low-power and high-power regulating circuit based on the determining.

23. The method of claim 22, wherein:
the selectively enabling comprises selectively enabling the low-power and high-power regulating circuit when the determining indicates that the power supply device is coupled with the electronic device; and
the selectively disabling comprises selectively disabling the low-power and high-power regulating circuit when the determining indicates that the power supply device is not coupled with any electronic device.

24. The method of claim 14, wherein the selectively enabling comprises:
selectively enabling the low-power regulating circuit and disabling the high-power regulating circuit when the determining indicates that the power supply device is not coupled with any electronic device; and
selectively enabling the high-power regulating circuit and disabling the low-power regulating circuit when the determining indicates that the power supply device is coupled with the electronic device.

25. The method of claim 24, further comprising:
opening the switch at the output of the high-power regulating circuit when the determining indicates that the power supply device is not coupled with any electronic device; and closing the switch at the output of the high-power regulating circuit when the determining indicates that power supply device is coupled with the electronic device.

26. A power supply device comprising:
a first and a second AC-to-DC converter each operable to receive an electric power signal with an alternating current and output an electric power signal with a direct current;
a first switch coupled with the first AC-to-DC converter and operable to switch between at least an open position and a closed position;
a second switch coupled with the second AC-to-DC converter and operable to switch between at least an open position and a closed position; and
control circuitry coupled with the first and second converters, powered by the first converter, and operable to selectively enable the converters when the power supply device is coupled with an electronic device, wherein the selectively enabling is independent from the position of the switches, wherein the selectively enabling is independent from a power level of the electric power signal,
wherein the first converter comprises a low-power regulating circuitry portion operable to output the electric power signal up to a first power limit, wherein the second converter comprises a high-power regulating circuitry portion operable to output the electric power signal up to a second power limit, wherein the second power limit is higher than the first power limit.

27. A method for providing electric power to an electronic device, the method comprising:
coupling a power supply device to a source of raw electrical power, wherein the power supply device comprises a first and a second AC-to-DC converter and a first and a second switch coupled with the first and the second AC-to-DC converters and operable to switch between at least an open position and a closed position;
determining when the power supply device is coupled with the electronic device; and
selectively enabling the first and the second AC-to-DC converters based on the determining, wherein the selectively enabling is independent from the position of the switches, wherein the selectively enabling is independent from a power level of the raw electric power,
wherein the first converter comprises a low-power regulating circuitry portion operable to output the electric power up to a first power limit, wherein the second converter comprises a high-power regulating circuitry portion operable to output the electric power up to a second power limit, wherein the second power limit is higher than the first power limit.

28. The method of claim 27, wherein the selectively enabling comprises selectively enabling the second AC-to-DC converter when the determining indicates that the power supply device is coupled with the electronic device.

* * * * *